Patented Feb. 2, 1926.

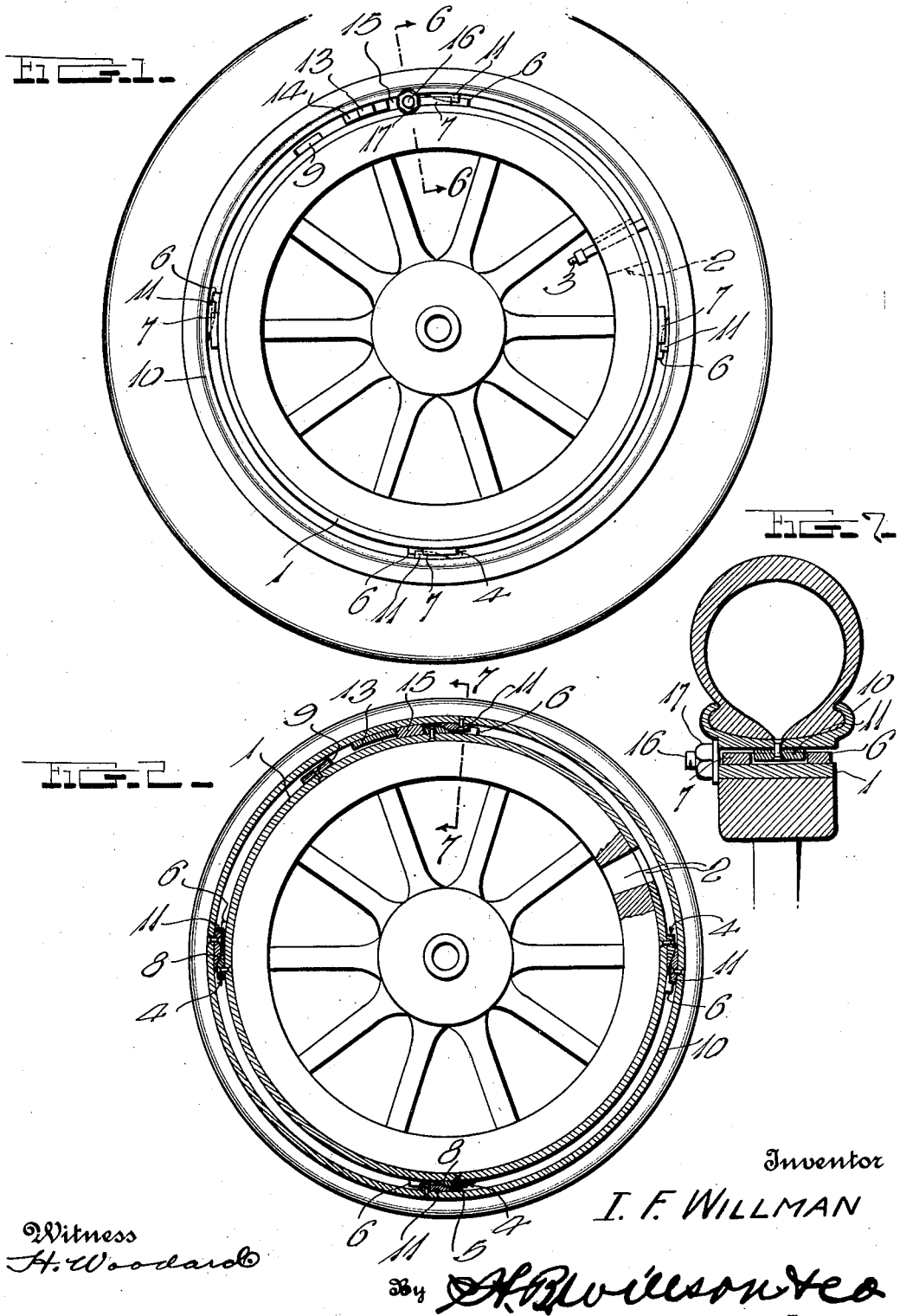

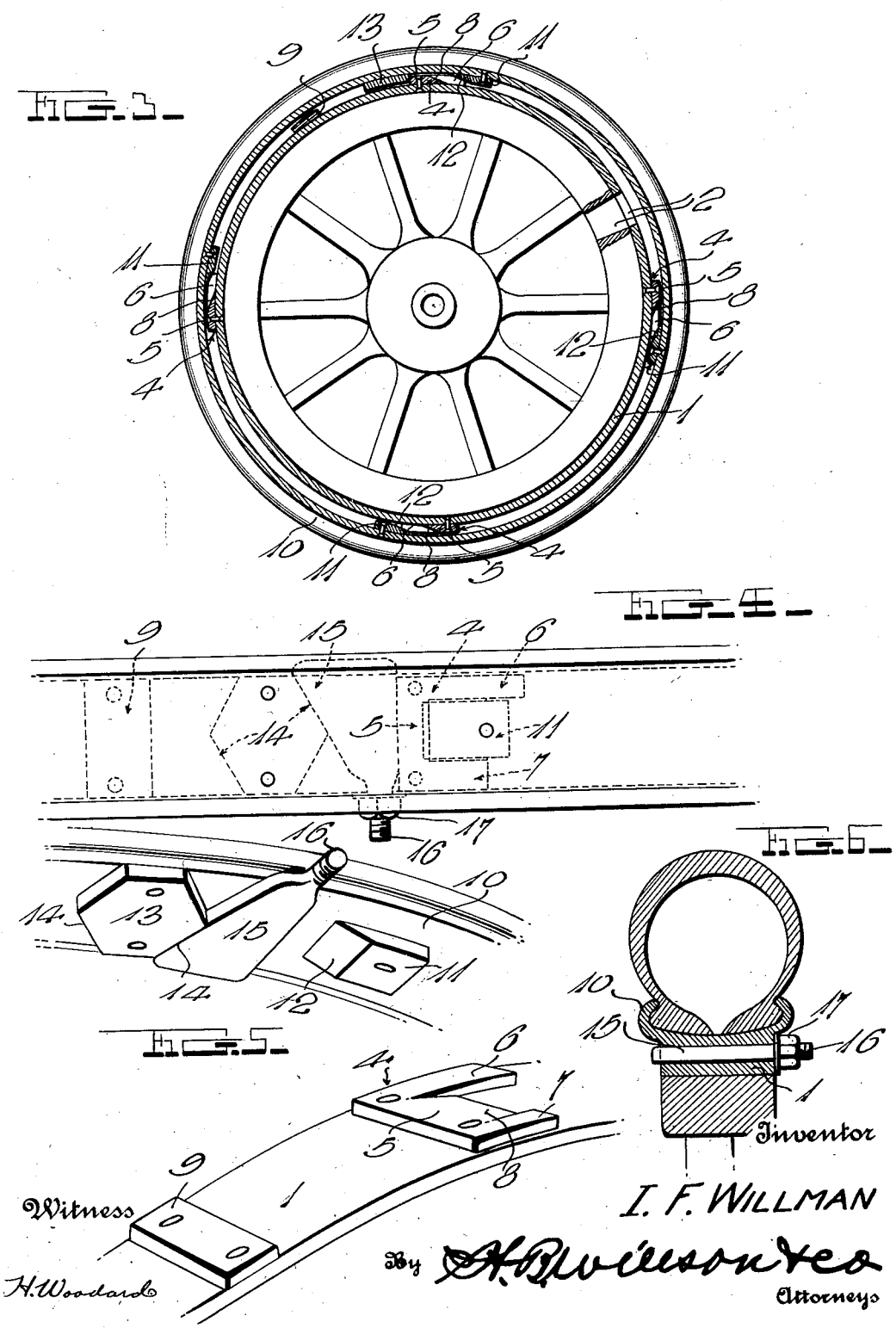

1,571,830

UNITED STATES PATENT OFFICE.

IRVIN F. WILLMAN, OF MULESHOE, TEXAS.

DEMOUNTABLE RIM.

Application filed May 7, 1923. Serial No. 637,272.

*To all whom it may concern:*

Be it known that I, IRVIN F. WILLMAN, a citizen of the United States, residing at Muleshoe, in the county of Bailey and State of Texas, have invented certain new and useful Improvements in Demountable Rims; and I do declare the following to be a full, clear, and exact description of the invention, such as will enable others skilled in the art to which it appertains to make and use the same.

My invention relates to improvements in demountable rims and more particularly to means for rigidly securing the rim upon the wheel felly by circumferentially turning said rim upon the wheel.

One object of the invention is to provide a simple, inexpensive and easily operable arrangement for tightly mounting the rim upon the wheel when it is turned in the proper direction.

Another object is to provide a transverse wedge and shoulders co-operable therewith for turning the rim on the wheel in a direction to either release or lock the rim.

With the foregoing in view, the invention resides in the novel subject matter hereinafter described and claimed, the description being supplemented by the accompanying drawings.

Figure 1 is a side elevation of an automobile wheel, rim and tire showing my invention.

Figure 2 is a sectional view in a central plane showing the means for locking the rim upon the felly.

Figure 3 is a duplicate of Fig. 2 with the exception that it illustrates the rim in a released position, preparatory to removal.
Figure 4 is an outer side view of a portion of the rim and felly, showing more particularly the means for locking the rim on the wheel and moving said rim in either direction.
Figure 5 is a disassembled perspective view showing more clearly the construction of the parts dotted in Fig. 4.

Figure 6 is a transverse sectional view on line 6—6 of Fig. 1.
Figure 7 is a similar view on line 7—7 of Fig. 2.

In the drawings above briefly described, the numeral 1 designates the felly band of an automobile wheel, this band and the felly of the wheel being formed with a suitable slot 2 to receive the usual tire valve 3. At a suitable number of circumferentially spaced points, the felly band 1 is provided with substantially flat lugs 4 each having a portion 5 extending transversely of the wheel and a pair of spaced circumferentially extending arms 6 and 7 which extend in the same direction from said transverse portion 5, the arms 6 at the inner side of the wheel being preferably longer than the arm 7 at the other side thereof. Preferably, the transverse portion 5 is beveled at 8 between the arms 6 and 7, on a substantially tangential line.

At a point spaced circumferentially from one of the lugs 4, is an additional lug 9 for a purpose to appear, said lug being carried by the felly band 1. If desired, all of the lugs 4 and 9 may be cut from suitable gage metal and riveted to said felly band, but an integral structure may be used if desired.

The demountable rim is designated by the numeral 10 and may be of the continuous type or any other desired form, with either straight side or clincher beads. The inner side of this rim is provided at circumferentially spaced points with central lugs 11 which are receivable between the arms 6 and 7 of the lugs 4 when the rim is turned in the proper direction on the wheel.

It is to facilitate proper positioning of the lugs 11 between the arms 6 and 7, that the arms 6 extend beyond said arms 7. Thus, when the rim is applied to the wheel, the lugs 11 will strike the arms 6, whereupon turning of the rim in the proper direction will properly position the lugs 11 between the outer and inner arms. If the bevels 8 are employed and they preferably are, the lugs 11 are similarly beveled as indicated at 12, whereby the rim may be tightly wedged upon the wheel.

The numeral 13 designates an additional lug carried by the inner side of the rim 10, in position for reception between the lug 9 and the adjacent lug 4, said lug 13 being spaced from one of the lugs 11, to such an extent that when said lug 13 will just clear said lug 4 and permit the rim to be moved onto the wheel, all of the lugs 11 will strike the long arms 6 of the lugs 4.

Opposite edges 14 of the lug 13 extend obliquely across the rim 10 and in the present showing said edges converge from the center of the rim to both edges of the latter.

A flat wedge 15 is insertible between the lug 13 and the adjacent lug 4 to forcibly turn the rim upon the wheel and lock the lugs 11 in tight engagement with the lugs 4 and if desired, when this wedge is removed, it may be reinserted between the lug 13 and the lug 9, thereby turning the rim in a direction to release it from the lugs 4. In the preferred form of construction the wedge 15 is provided with a threaded stem 16 on one end and one of the edges of the wedge is parallel with the axis of this stem, this edge being adapted to contact with the shoulder formed by one edge of the adjacent lug 4, while the opposite edge of the wedge co-acts with any of the shoulders formed by the edges of the lug 13. After insertion of the wedge, it may be driven in place by a hammer if desired, or by threading a nut 17 onto the stem 16, it will be drawn to a tight locking position.

By employing the details shown and described, a simple and inexpensive, yet an efficient, easily operable and reliable means will be provided for mounting a rim demountably upon a wheel. The construction is such that any rim may be applied to any wheel of the machine, but the lugs 4 at one side of the machine are the reverse of those at the other side thereof, except that the long arms 6 of said lugs are at the inner side of the wheel, on both sides of the machine. It will be seen that the oblique edges 14 of the lug 13 will permit the wedge 15 to properly act, regardless of the side of the machine at which the rim is used and furthermore that the wedge may be inserted from either side of the wheel, as may be most desirable.

As excellent results are obtainable from the details disclosed, they are preferably followed, but within the scope of the invention as claimed, numerous minor changes may be made.

I claim:

A demountable rim having a flat lug on its inner side, said lug having two edges extending circumferentially of the rim, and two angular edges extending transversely of the rim and disposed in planes at right angles to said inner side of the rim, both ends of each of said angular edges being disposed at a common acute angle with respect to the edges of the rim, for co-action with a wedge.

In testimony whereof I have hereunto affixed my signature.

IRVIN F. WILLMAN.